United States Patent [19]
Neuberg et al.

[11] Patent Number: 5,891,573
[45] Date of Patent: Apr. 6, 1999

[54] METHOD OF PROVIDING FRIABLE POLYTETRAFLUOROETHYLENE PRODUCTS

[75] Inventors: Nicholas W. Neuberg, Perrinville; George Poszmik, Parlin; Manshi Sui, Somerville, all of N.J.

[73] Assignee: Shamrock Chemicals Corporation, Newark, N.J.

[21] Appl. No.: 908,576

[22] Filed: Aug. 8, 1997

[51] Int. Cl.$^6$ ................ B32B 5/16; C08F 6/00; C08J 3/28
[52] U.S. Cl. ............ 428/402; 528/483; 528/486; 528/491; 528/493; 528/495; 528/497; 528/499; 528/503; 524/284; 524/356; 524/366; 524/379; 522/80; 522/84; 522/86; 522/79
[58] Field of Search ............. 528/483, 486, 528/491, 493, 495, 497, 499, 503; 524/284, 356, 366, 379; 522/79, 80, 84, 86; 428/402

[56] References Cited

U.S. PATENT DOCUMENTS

| | | |
|---|---|---|
| 2,858,442 | 10/1958 | Dewey, II . |
| 3,440,466 | 4/1969 | Colvin et al. . |
| 3,527,940 | 9/1970 | Balanca et al. . |
| 3,655,965 | 4/1972 | Icre et al. . |
| 3,766,031 | 10/1973 | Dillon . |
| 3,780,305 | 12/1973 | Free . |
| 3,838,030 | 9/1974 | Kagiya et al. . |
| 3,878,164 | 4/1975 | Lott . |
| 4,029,870 | 6/1977 | Brown et al. . |
| 4,036,718 | 7/1977 | Brown et al. . |
| 4,052,278 | 10/1977 | Brown et al. . |
| 4,062,127 | 12/1977 | Pfeiffer et al. . |
| 4,110,186 | 8/1978 | Arkles et al. . |
| 4,220,511 | 9/1980 | Derbyshire . |
| 4,777,192 | 10/1988 | Neuberg et al. . |
| 5,576,106 | 11/1996 | Kerbow et al. . |

FOREIGN PATENT DOCUMENTS 1516648   6/1975   United Kingdom .

*Primary Examiner*—Samuel A. Acquah
*Attorney, Agent, or Firm*—Baker & Botts

[57] ABSTRACT

A method is disclosed for providing a friable polytetrafluoroethylene (PTFE) product that has particles of a desired size which are flowable and do not tend to agglomerate. To achieve this result, the PTFE starting material is handled at a temperature below 66° F., and preferably below 55° F., before irradiating. The PTFE starting material may be mixed with a wetting agent before irradiating to provide a product that has enhanced dispersibility. The source of radiation may include electron beam radiation, nuclear radiation, or radiation from a cobalt-60 ($CO_{60}$) source.

33 Claims, No Drawings

METHOD OF PROVIDING FRIABLE POLYTETRAFLUOROETHYLENE PRODUCTS

BACKGROUND OF THE INVENTION

This invention relates generally to the radiation degradation of polytetrafluoroethylene (PTFE) to provide an improved PTFE product.

Several techniques generally make use of electron beam or cobalt sources for irradiating PTFE. U.S. Pat. No. 3,766,031 to Dillon discloses a method for radiation processing of PTFE, wherein PTFE is exposed to radiation and thereafter subjected to comminution to provide a fine particle powder. The PTFE starting material is arranged in trays and exposed to multiple doses of radiation, approximately 2 to 15 M Rad per pass, so that the temperature of the material does not rise excessively, thereby to avoid discoloration of the material and the possible generation of noxious gases. The total dose is approximately 35 to 150 M Rad. Among other things, the resulting powder is useful as a dry lubricant in paints and inks.

U.S. Pat. No. 5,576,106 to Kerbow et al. ("Kerbow") discloses a method of radiation-induced grafting of ethylenically unsaturated components such as maleic anhydride onto fluoropolymers to provide a powder that is effective as an adhesive to join dissimilar materials. Suitable fluoropolymers include copolymers of ethylene with tetrafluoroethylene. Kerbow discloses that the average particle size of the base fluoropolymer is 50–500 µm. The fluoropolymer and the grafting compound are mixed or otherwise brought into proximity in the presence of ionizing radiation doses in the range of about 2–6 M Rad. Kerbow discloses that the grafted powder can be applied to a surface from a dispersion or can be blended with a liquid. Kerbow does not disclose how to provide a friable polymer product having smaller particle sizes, nor does Kerbow teach specific handling techniques to prevent the formation of agglomerations or fibers upon subjecting the polymer products to grinding or shearing.

U.S. Pat. No. 4,029,870 to Brown et al. ("Brown '870") and U.S. Pat. No. 4,036,718 to Brown et al. ("Brown '718") each disclose processes for providing dispersions of PTFE in organic solvents. The processes entail irradiating PTFE and subsequently adding the resulting product to the organic solvent. The combination is then subjected to high shear mixing to break PTFE agglomerations down to sub-micron size particles and to thereby provide the dispersion. Brown '718 and Brown '870 further teach that this dispersion may be introduced into oils and greases, and is useful in formulating PTFE coatings. U.S. Pat. No. 4,052,278 to Brown et al. ("Brown '278") further discloses a process in which PTFE is first irradiated, then dry milled, and then dispersed in an aqueous or organic solvent. Brown '278 teaches that this process facilitates dispersion as compared to simply blending PTFE with a dispersing medium during a high shear mixing step.

U.S. Pat. No. 4,777,192 to Neuberg et al. discloses an apparatus and method for radiation degradation of PTFE, wherein radiation is supplied to a zone of a vessel, and agitation is provided to move portions of the PTFE material into and out of the irradiated zone. Provision is made for cooling the PTFE, including a cooling jacket or an addition of water to the reaction vessel. Neuberg et al. further teaches that an addition of water lowers the oil absorption of the resulting powder. An addition of air or oxygen to the reaction mixture is also disclosed.

British Patent 1,516,648 to Kholodov et al. discloses a method for regenerating PTFE wherein previously degraded PTFE is irradiated in the presence of fluorinated monomers. The process thereby causes a grafting of the monomers onto the PTFE. Kholodov further discloses a use of cooling water circulating through a jacket on the reactor vessel, and an addition of water directly to the PTFE and fluorinated monomers. The Kholodov reference teaches radiation regeneration, rather than radiation degradation. Accordingly, the effect of practicing the Kholodov method is to increase, rather than decrease the molecular weight of the PTFE. The reference also teaches that oils should be removed from the PTFE prior to irradiation.

U.S. Pat. No. 3,838,030 to Kigiya et al. discloses a process for preparing PTFE resin wax, whereby PTFE is degraded by an ionizing radiation in the presence of a gaseous mixture of air or oxygen with hydrogen and/or the vapor of halogenated methane. Prior to irradiation, the material is held at a temperature of 350° C. (662° F.).

U.S. Pat. No. 4,220,511 to Derbyshire discloses a method for providing a grindable PTFE material in which PTFE is irradiated in the presence of air or oxygen on a conveyer with concurrent or subsequent heating to a temperature of from 150° F. to 600° F. by an air-circulating oven. U.S. Pat. No. 2,858,442 to Dewey discloses an apparatus for irradiating: (1) a flexible sheet material; (2) a multiplicity of thin sheets; and (3) a filamentary material. Dewey also teaches that fluids may be irradiated by conveying them through an electron beam in a direction parallel to the direction of the electron flow.

The prior art methods of radiation degradation of PTFE do not provide friable PTFE products having micron and sub-micron sized particles that are flowable and/or easily dispersed in, for example, paints, inks, plastics, adhesives, motor oil and oil additives, and components thereof. Milling methods have limited ability to impart friability to such PTFE, or to provide fine, flowable powders that do not agglomerate. In addition, although the PTFE products of such methods can be dispersed in certain organic solvents with the aid of surfactants, a low surface energy often presents wetting limitations. Accordingly, a need exists for a simple technique for providing friable PTFE products having micron and sub-micron sized particles which exhibit superior flowability and/or dispersion characteristics in a variety of media.

SUMMARY OF THE INVENTION

The above-discussed shortcomings of the prior art are overcome, and the aforementioned need is substantially satisfied by the present invention, which in one aspect is a method for providing a friable polytetrafluoroethylene (PTFE) product, having particles of a desired size, from PTFE starting material prepared by emulsion polymerization. In accordance with the invention, the PTFE starting material is maintained during handling at a temperature below 66° F., and preferably below 55° F., and then irradiated to provide a product which has a decreased average molecular weight and the desired particle size, or is readily comminuted without agglomeration to the desired particle size. By virtue of the invention, it is possible to obtain smaller particle sizes than are provided by comparable methods previously known in the art.

In a preferred embodiment of the invention, the PTFE starting material is again maintained during handling at a temperature below 66° F., and preferably below 55° F., but a wetting agent is mixed with the PTFE starting material at such temperature to provide a mixture, and at least a portion of the mixture is then irradiated to thereby provide the PTFE product. Appropriate wetting agents include water, alcohols, paraffins such as Isopar (isoparaffins having seven to 14 carbon atoms, provided by Exxon), unsaturated hydrocarbons such as n-tetradecene, hydrocarbon oils, maleic anhydride, and acetone. Isopropyl alcohol is a preferred alcohol. Preferred hydrocarbon oils are those that are saturated.

For a better understanding of the present invention, together with further objects, reference is made to the following description, and the scope of the invention is identified in the appended claims.

DETAILED DESCRIPTION

As stated in the foregoing discussion, superior PTFE products may be provided from emulsion polymerized PTFE starting material by the steps of (1) maintaining the PTFE starting material at a temperature below 66° F. during handling, and (2) irradiating the cold-handled material as described below. (The term, "during handling," includes any agitation, moving or touching of the PTFE material which would cause agglomeration). This method decreases the average molecular weight of the PTFE; provides a product that is more friable than conventionally handled, prepared and irradiated PTFE materials; and provides a product that has or is readily comminutable without agglomeration to smaller sub-micron-sized particles. (The term, "conventionally prepared and irradiated," includes the methods cited in the background of this disclosure.) In addition, the PTFE product of this method has a reduced tendency to form fibers.

Generally, the starting material of the present invention is emulsion polymerized PTFE, which is also known as "coagulated dispersion grade PTFE." However, similar paste-type PTFE materials (virgin or non-virgin) are considered to be equivalent and suitable in this application.

In each embodiment of the present invention, appropriate sources of radiation include an electron beam, nuclear radiation, or radiation from a cobalt-60 ($CO_{60}$) source. One known method for exposing a material to an electron beam comprises generating electrons in a vacuum and directing them through a titanium or light metal window to the material being irradiated. Regardless of the radiation source, the total radiation dosage is preferably between 5 M Rad and 200 M Rad, and most preferably between 20 M Rad and 60 M Rad. When the PTFE starting material has an average agglomeration size of about 50 micrometers, such dosage suffices to enable grinding or otherwise micronizing the agglomerations to sizes smaller than 5 micrometers, and preferably to particles that are between 0.1 and 0.6 micrometers in size. By the above-described technique, the inventors have been able to degrade and micronize a PTFE starting material to fine particles, at least 99.6 percent of which were less than 5 micrometers in size, with the average particle size being 0.3 micrometers.

In any of the embodiments of the present invention, all or part of the PTFE may be irradiated continuously or intermittently. The PTFE may be irradiated in a closed vessel, all or part of which may be subjected to the radiation. The PTFE may be cooled during and/or after irradiation. Preferably, the PTFE is cooled below 55° F. immediately after irradiation.

In each embodiment, the PTFE may be exposed to a polymer chain terminating agent before or during irradiation. Appropriate polymer chain terminating agents include diatomic oxygen ($O_2$) and air.

In the embodiment wherein a wetting agent is cold-mixed with the PTFE starting material prior to irradiating, the irradiated PTFE product is more dispersible in fluids than conventionally prepared and irradiated PTFE products. The inventors hypothesize that the radiation causes free radicals to be generated on the PTFE molecules, which provide reactive sites where the wetting agents may become chemically bound and thereby permanently attached to the PTFE. The chemically bound wetting agent apparently reduces the surface tension between the dispersing medium and the irradiated PTFE, thereby facilitating the dispersion. The inventors have found that this addition of wetting agent does not adversely affect, and may further enable the ability of the present invention to provide more friable PTFE product than the product provided by conventional PTFE irradiation methods.

According to the invention, the PTFE starting material is handled and mixed with the wetting agent at a temperature below 66° F. prior to irradiation, and preferably at a temperature below 55° F. The respective components are preferably supplied in an amount to provide a mixture that is 50 to 99 percent by weight PTFE. The mixture is then irradiated as described above.

The wetting agent may comprise virtually any liquid. An initial rule of thumb is to select a wetting agent that is chemically similar to the dispersing medium. Thus, a wetting agent may be selected from the solvent(s) comprising the dispersing medium, or from other comparable materials. For example, isopropyl alcohol would be a good initial choice if the dispersing medium itself contained isopropyl alcohol. Although several wetting agents may be used at once, it would not be necessary for the mixture to include a corresponding wetting agent for each component in the dispersing medium.

The artisan will appreciate that the use of a wetting agent is most advantageous in those cases wherein the "dispersing medium" is least accommodating to PTFE dispersion. Presently, there exists a large commercial market for oil additives that contain PTFE. Known techniques for providing PTFE dispersions in motor oil generally involve dispersing the PTFE in an organic solvent and then blending the dispersion with the motor oil. This two-step process, which requires an additional solvent, is performed because motor oil is somewhat less accommodating to PTFE dispersion than the otherwise compatible solvents. In view of the present commercial market for oil additives, such considerations make the present invention particularly advantageous. According to the present invention, the wetting agent may comprise motor oil, so that the wetted PTFE product is more easily dispersed directly in motor oil. When oil additive solvents are nevertheless desirable, the present invention expands the range of solvents in which the PTFE may be dispersed, thereby providing enhanced flexibility in selecting solvents that are compatible with other oil additive components.

EXAMPLES OF A PREFERRED EMBODIMENT

The superior friability, dispersibility, and particle size of a product prepared by the preferred embodiment of the present invention, in which PTFE starting material is mixed with a wetting agent prior to irradiation, was illustrated by a series of experiments in which such product was blended with a dispersing medium and compared to a control in which the PTFE had not been mixed with a wetting agent prior to irradiation. (The term, "mix" is used herein to designate the combining of wetting agent and PTFE, as opposed to the term "blend," which is used to designate the combining of irradiated batches and dispersing media).

In these experiments, PTFE starting materials were exposed to electron beam radiation to provide irradiated batches, which were then blended with dispersing media. In all cases, coagulated dispersion grade PTFE (Polyflon F-104, provided by Daikin) was used.

Control batches of irradiated PTFE were prepared by handling PTFE starting material at a temperature below 66° F., and then exposing the material to 28 M rad of electron beam radiation in an uncovered aluminum dish. Test batches were prepared in the same manner, with the exception that they were made by mixing PTFE in a tumbler with a wetting agent to provide a composition of 80 wt. % and 20 wt. % of the respective components prior to irradiating.

In Example 1 (below), an unsaturated low molecular weight hydrocarbon oil was selected as the wetting agent. In Example 2 (below), a saturated oil was selected to demonstrate that unsaturation was not required for chemical bonding of the wetting agent to the PTFE.

Blends of the respective control and test batches with hydrocarbon oil dispersing media were made by blending the components in paint shaking devices, using glass beads as grinding media.

In the control cases, 10 g amounts of the control batches were blended with 40 g amounts of the dispersing media to provide control blends of 50 g having a 20% solids content.

Likewise, test blends of 50 g were provided by blending measured amounts of the test batches with measured amounts of the dispersing media. However, the actual respective "measured amounts" depended on which of two alternative assumptions were being made about the evaporation of the wetting agent during irradiation. The goal was to obtain blends having the same 20% overall solids content as obtained in the control dispersions, under either of these two assumptions.

The first assumption was that all of the unreacted, free wetting agent had evaporated from the test batch during irradiation. Under that assumption, 10 g of the test batch and 40 g of the dispersing medium was required to obtain a 50 g test blend having a 20% solids content.

The second assumption was that none of the unreacted, free wetting agent had evaporated during irradiation (and little had reacted). Under that assumption, 12.5 g of the test batch, which would contain 80 wt. % (10 g) of PTFE and 20 wt. % (2.5 g) of wetting agent, was blended with 37.5 g of dispersing medium to obtain a 50 g test blend, having a presumed overall solids content of 20%. This case made it possible to prove that observed improvements in friability, dispersibility, and particle size were properly attributable to chemical wetting rather than to an excess amount of free liquid wetting agent.

Example 1

In this Example, poly-alpha olefin (PAO) hydrocarbon oil (Durasyn 162 from Albemarle Corp.) was selected as the dispersing medium. N-tetradecene (Gulftene 14 from Gulf Oil Chemicals Co.) was selected as the unsaturated wetting agent, in part because of its compatibility with PAO and its lower susceptibility to evaporation in an open system than, for example, isopropyl alcohol.

The control and test batches were irradiated as described above, from which blends with PAO were prepared—control blend and two test blends, as shown in Table 1. The two test blends were prepared to represent each end of a spectrum of possible n-tetradecene evaporation during irradiation. The first test blend was prepared under the assumption that all of the unreacted n-tetradecene had evaporated during irradiation to provide a material containing 100% solids. Thus, by blending 10 g of the irradiated test batch with 40 g of PAO, a 20% solids content was presumably obtained. The second blend was prepared under the assumption that none of the n-tetradecene had evaporated (and little had reacted) during irradiation, so that the irradiated test batch was presumably 80% solids. Consequently, by blending 12.5 g of the test batch with 37.5 g of PAO, a 20% solids content was presumably obtained. By providing data under either assumption of n-tetradecene evaporation, it was possible to prove the success of the present method regardless of the actual amount of n-tetradecene evaporation, and to ensure that any observed improvement in dispersibility could properly be attributed to chemical wetting rather than to an increase in the total amount of solvent from the addition of n-tetradecene.

TABLE 1

Approximate Composition of Control and Test Blends based on 10 g of PTFE - Example 1

|  | PTFE | n-tetradecene added (pre-irradiation) | n-tetradecene remaining (post-irradiation) | PAO added |
|---|---|---|---|---|
| Control Blend 1 | 10.0 g |  |  | 40.0 g |
| Test Blend 1* | 10.0 g | 2.5 g | 0.0 g | 40.0 g |
| Test Blend 2** | 10.0 g | 2.5 g | 2.5 9 | 37.5 9 |

*Assuming total evaporation of unreacted n-tetradecene.
**Assuming no evaporation of n-tetradecene.

The blending step comprised shaking the components with 1.6 to 2.0 mm glass beads (as grinding media) in 4 oz glass jars using a ¼ hp paint shaking device (Red Devil Paint Conditioner, Model No. 5400-02). A series of observations and measurements were made after periods of one, two, and three hours. Empirical observations are summarized in Table 2.

TABLE 2

Empirical Observations for Three Blends

| Time (hrs) | Control Blend 1 | Test Blend 2 | Test Blend 3 |
|---|---|---|---|
| 1 | Heavy, thick consistency. Glass beads suspended in blend. | Thin consistency, flowable. Glass beads fall out of blend. | Thin consistency, flowable. Glass beads fall out of blend. |
| 2 | Heavy, thick consistency. Glass beads suspended in blend. | Thin consistency, flowable. Glass beads fall out of blend. | Thin consistency, flowable. Glass beads fall out of blend. |
| 3 | Heavy, thick consistency. Glass beads suspended in blend. | Thin consistency, flowable. Glass beads fall out of blend. | Thin consistency, flowable. Glass beads fall out of blend. |

As indicated in Table 2, the test blends prepared according to the wetting embodiment of the present invention each exhibited lower viscosities than the control blend. Even in the "worst case" of Test Blend 3, which had the least amount of PAO solvent, the dispersibility was visibly greater than that of the control blend.

Further advantages of this preferred embodiment are illustrated by comparing the particle sizes of the control and test blends after each hour of shaking. Particle sizes were measured with a laser-scattering particle size analyzer (Microtrac II, Model No. 158705). As shown in Table 3, the test blends contained smaller particles than the control blend.

TABLE 3

Particle Sizes of Three Blends - Example 1

| Time (hrs) | Control Blend 1: Particle size, μm | Test Blend 2: Particle size, μm | Test Blend 3: Particle size, μm |
|---|---|---|---|
| 1 | 7.88 | 4.20 | 4.35 |
| 2 | 6.64 | 2.63 | 2.13 |
| 3 | 5.47 | 1.43 | 1.26 |

Accordingly, this preferred embodiment has the advantage of providing smaller particle sizes. Although a higher viscosity might have been expected due to the greater overall surface area of the smaller particles, a lower viscosity was actually observed. This surprising result may be attributed to the improved dispersibility of the chemically wetted PTFE.

The presence of chemical bonds between the wetting agent and the PTFE was proven by spectroscopically measuring the amount of n-tetradecene remaining in samples of the control and test blends that were extracted in toluene for 24 hours to remove any free n-tetradecene. Upon drying the samples in an oven for 4 hours at 100° C., the samples were scanned with a Fourier Transform Infrared (FTIR) spectrometer (Nicolet, Model No. 5MX). Characteristic $CH_2$ and $CH_3$ peaks in the wavelength range of 2800 $cm^{-1}$ to 3000 $cm^{-1}$ were observed in the test blend samples, but were not observed in the control blend sample. This indicates that the n-tetradecene in the test batches had chemically bonded to the PTFE during irradiation.

Example 2

In this Example, standard ink oil (Magiesol 47 Oil from Magie Bros.), which has a lower viscosity than PAO, was selected as the dispersing medium. N-tetradecane (from Acros Organics through Fisher Scientific) was selected as a saturated wetting agent. N-tetradecene (Gulftene 14 from Gulf Oil Chemicals Co.) was also selected as a wetting agent to provide a basis for comparison to the unsaturated counterpart, and to link the results of this Example to those of Example 1.

As shown in Table 4, six blends were prepared in the manner described in Example 1, with the exception that zirconium-silicate ceramic beads 1.2 to 2.0 mm in diameter (from SEPR Ceramic Beads and Powder) were used as grinding media.

TABLE 4

Approximate Composition of Control and Test Blends based an 10 g of PTFE - Example 2

| | PTFE | n-tetradecene added (pre-irradiation) | n-tetradecene remaining (post-irradiation) | n-tetradecane added (pre-irradiation) | n-tetradecane remaining (post-irradiation) | Magiesol 47 |
|---|---|---|---|---|---|---|
| Control Blend 2 | 10 g | | | | | 40.0 g |
| Test Blend 4* | 10 g | 2.5 g | 0.0 g | | | 40.0 g |
| Test Blend 5** | 10 g | 2.5 g | 2.5 g | | | 37.5 g |
| Test Blend 6+ | 10 g | | | 2.5 g | 0.0 g | 40.0 g |
| Test Blend 7++ | 10 g | | | 2.5 g | 2.5 g | 37.5 g |
| Test Blend 8● | 10 g | | | 2.5 g | 0.0 g | 40.0 g |

*Assuming total evaporation of unreacted n-tetradecene.
**Assuming no evaporation of n-tetradecene.
+Assuming total evaporation of unreacted n-tetradecane.
++Assuming no evaporation of n-tetradecane.
●Post-irradiated PTFE was extracted for 10 hours in toluene and dried to remove excess n-tetradeaane.

After one hour of blending, the average particle size of each blend was determined by a Microtrac II Laser Scattering Analyzer (from Leeds & Northrup Model Number 158705). The results are shown in Table 5.

TABLE 5

Particle Sizes - Example 2

| | Particle Size, μm |
|---|---|
| Control Blend 2 | 6.58 |
| Test Blend 4 | 3.23 |
| Test Blend 5 | 2.86 |
| Test Blend 6 | 1.54 |
| Test Blend 7 | 1.47 |
| Test Blend 8 | 1.48 |

In Table 5, the smaller particle sizes of Test Blends 4–8, as compared to those of Control Blend 2, confirmed that exposing the PTFE to a wetting agent prior to irradiating provides a superior friability. Test Blends 6 and 7, in which n-tetradecane was used as a saturated wetting agent, did not show any less improved friability than Test Blends 4 and 5, in which the unsaturated n-tetradecene was used. In fact, the particle sizes of Test Blends 6 and 7 were smaller than those of Test Blends 4 and 5, suggesting an unexpected advantage in using saturated wetting agents.

The closeness of the average particle size of Test Blend 7 with that of Test Blend 8, in which any unreacted n-tetradecane was removed by toluene extraction, verifies that there was no significant contribution to the positive results by any free wetting agent that may have remained on the irradiated materials.

Grafting of the wetting agents to the PTFE was again shown by FTIR spectroscopy. Samples of Test Blends 4-8 each showed characteristic $CH_2$ and $CH_3$ vibrational peaks in the 2890 and 2990 range. These samples were extracted in toluene for 10 hours each to remove any excess hydrocarbon oil, so the peaks are evidence of chemical bonding. Significantly, samples from the Control Blend (which did not undergo pre-wetting) showed none of the hydrocarbon peaks.

We claim:

1. A method for providing a friable polytetrafluoroethylene product having particles of a desired size comprising:
   a) maintaining a polytetrafluoroethylene starting material at below 66° F. during handling prior to irradiation; and
   b) irradiating at least a portion of said starting material to provide a friable polytetrafluoroethylene product having particles of said desired size, or being readily comminutable without agglomeration to particles of said desired size.

2. The method according to claim 1, wherein said polytetrafluoroethylene starting material is maintained at below 55° F. during handling prior to irradiation.

3. The method according to claim 1, wherein said starting material comprises emulsion polymerized polytetrafluoroethylene.

4. The method according to claim 1, wherein said polytetrafluoroethylene is irradiated in the presence of a polymer chain terminating agent.

5. The method according to claim 4, wherein said polymer chain-terminating agent comprises diatomic oxygen.

6. The method according to claim 4, wherein said polymer chain terminating agent comprises air.

7. The method according to claim 1, wherein said starting material comprises agglomerations of an initial size greater than 50 micrometers.

8. The method according to claim 1, wherein said desired size is less than 5 micrometers.

9. The method according to claim 1, wherein said desired size is from 0.1 to 0.6 micrometers.

10. The method according to claim 1, wherein said irradiating comprises an exposure to a type of radiation selected from the group consisting of electron beam radiation, nuclear radiation, and radiation from a cobalt-60 ($CO_{60}$) source.

11. The method according to claim 1, wherein said irradiating comprises an exposure to a total radiation dosage of from 1 M Rad to 200 M Rad.

12. The method according to claim 1, wherein said irradiating comprises an exposure to a total radiation dosage of from 5 M Rad to 60 M Rad.

13. The method according to claim 1, wherein said irradiating comprises irradiating at least a portion of a vessel containing said polytetrafluoroethylene starting material.

14. The method according to claim 13, wherein said irradiating comprises irradiating a closed portion of said vessel.

15. The method according to claim 13, further comprising cooling at least a portion of said vessel.

16. The method according to claim 1, further comprising cooling during to said irradiating.

17. The method according to claim 1, further comprising the step of cooling said friable polytetrafluoroethylene product after said irradiating.

18. A method for providing a friable, wetted polytetrafluoroethylene product having particles of a desired size comprising:
   a) maintaining a polytetrafluoroethylene starting material at below 66° F. during handling prior to irradiation;
   b) mixing said polytetrafluoroethylene starting material at below 66° F. with a wetting agent to provide a mixture; and
   c) irradiating at least a portion of said mixture to provide a wetted polytetrafluoroethylene product having particles of said desired size or being comminutable without agglomeration to particles of said desired size.

19. The method according to claim 18, wherein said polytetrafluoroethylene starting material is maintained at below 55° F. during handling, and mixed at below 55° F. with said wetting agent to provide said mixture.

20. The method according to claim 18, wherein said wetting agent is selected from the group consisting of water, an alcohol, a paraffin, an unsaturated hydrocarbon, a hydrocarbon oil, maleic anhydride, and acetone.

21. The method according to claim 20, wherein said alcohol comprises isopropyl alcohol.

22. The method according to claim 20, wherein said paraffin comprises n-tetradecane.

23. The method according to claim 20, wherein said unsaturated hydrocarbon comprises n-tetradecene.

24. The method according to claim 20, wherein said hydrocarbon oil is unsaturated.

25. The method according to claim 18, wherein said wetting agent comprises a liquid during said mixing.

26. The method according to claim 25, wherein said wetting agent comprises a liquid during said irradiating.

27. The method according to claim 18, wherein said polytetrafluoroethylene starting material and said wetting agent are provided in amounts to provide a mixture containing 50 to 99 percent polytetrafluoroethylene.

28. A method for providing a polytetrafluoroethylene dispersion comprising blending said product of claim 18 with a dispersing medium.

29. The method according to claim 28, wherein said dispersing medium comprises said wetting agent.

30. The method according to claim 28, wherein said dispersing medium comprises motor oil.

31. A product made according to the methods of any of claims 1, 2, 18, 19, 20, or 28.

32. A friable polytetrafluoroethylene product having particles of a desired size provided by:
   a) maintaining a polytetrafluoroethylene starting material at below 66° F. during handling prior to irradiation; and
   b) irradiating at least a portion of said starting material to provide a friable polytetrafluoroethylene product having particles of said desired size, or being readily comminutable without agglomeration to particles of said desired size.

33. A friable, wetted polytetrafluoroethylene product having particles of a desired size provided by:
   a) maintaining a polytetrafluoroethylene starting material at below 66° F. during handling prior to irradiation;
   b) mixing said polytetrafluoroethylene starting material at below 66° F. with a wetting agent to provide a mixture; and
   c) irradiating at least a portion of said mixture to provide a wetted polytetrafluoroethylene product having particles of said desired size or being comminutable without agglomeration to particles of said desired size.

* * * * *